Jan. 22, 1924.
C. T. NELSON
1,481,620
DRAFT GEAR
Filed July 21, 1922
3 Sheets-Sheet 1
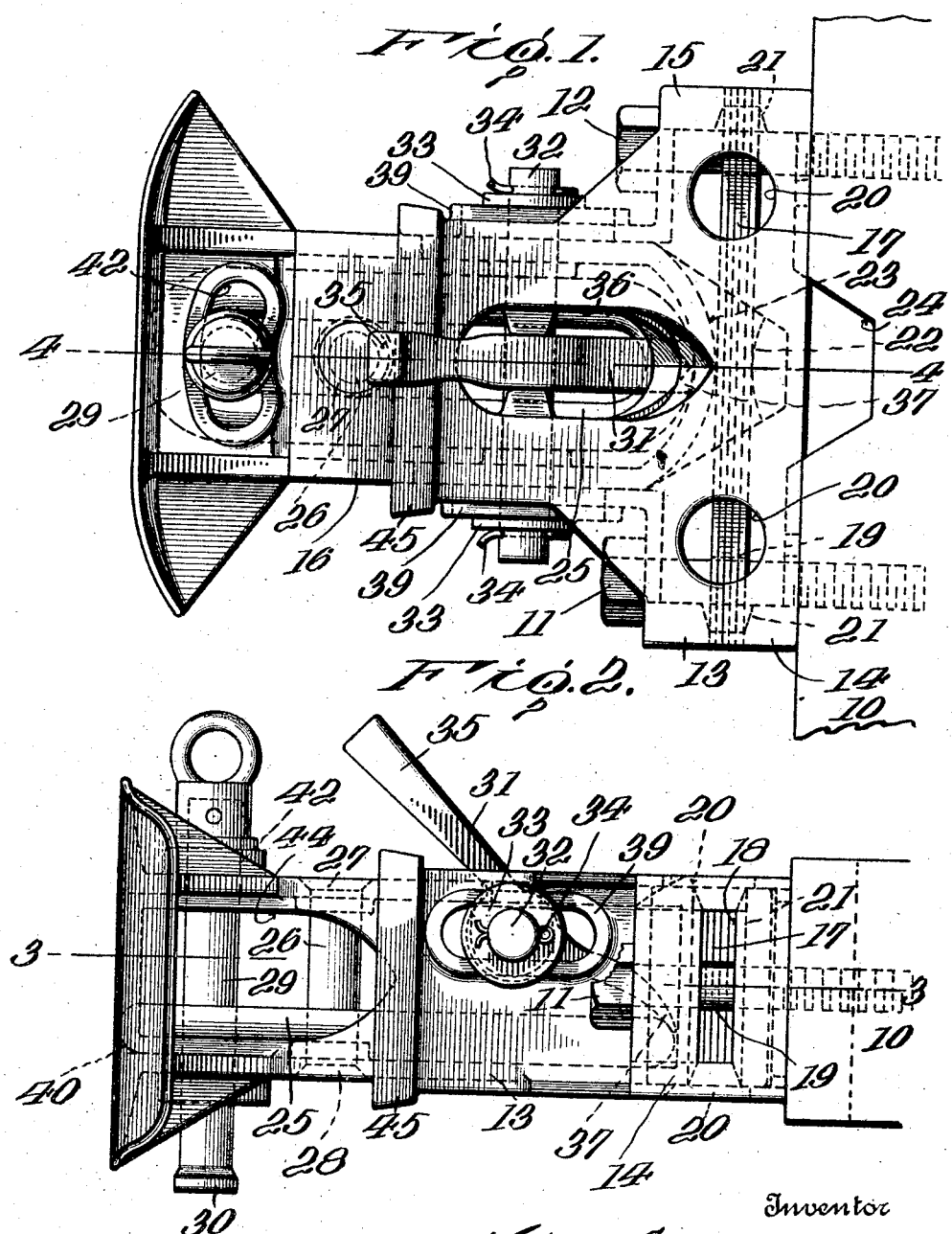

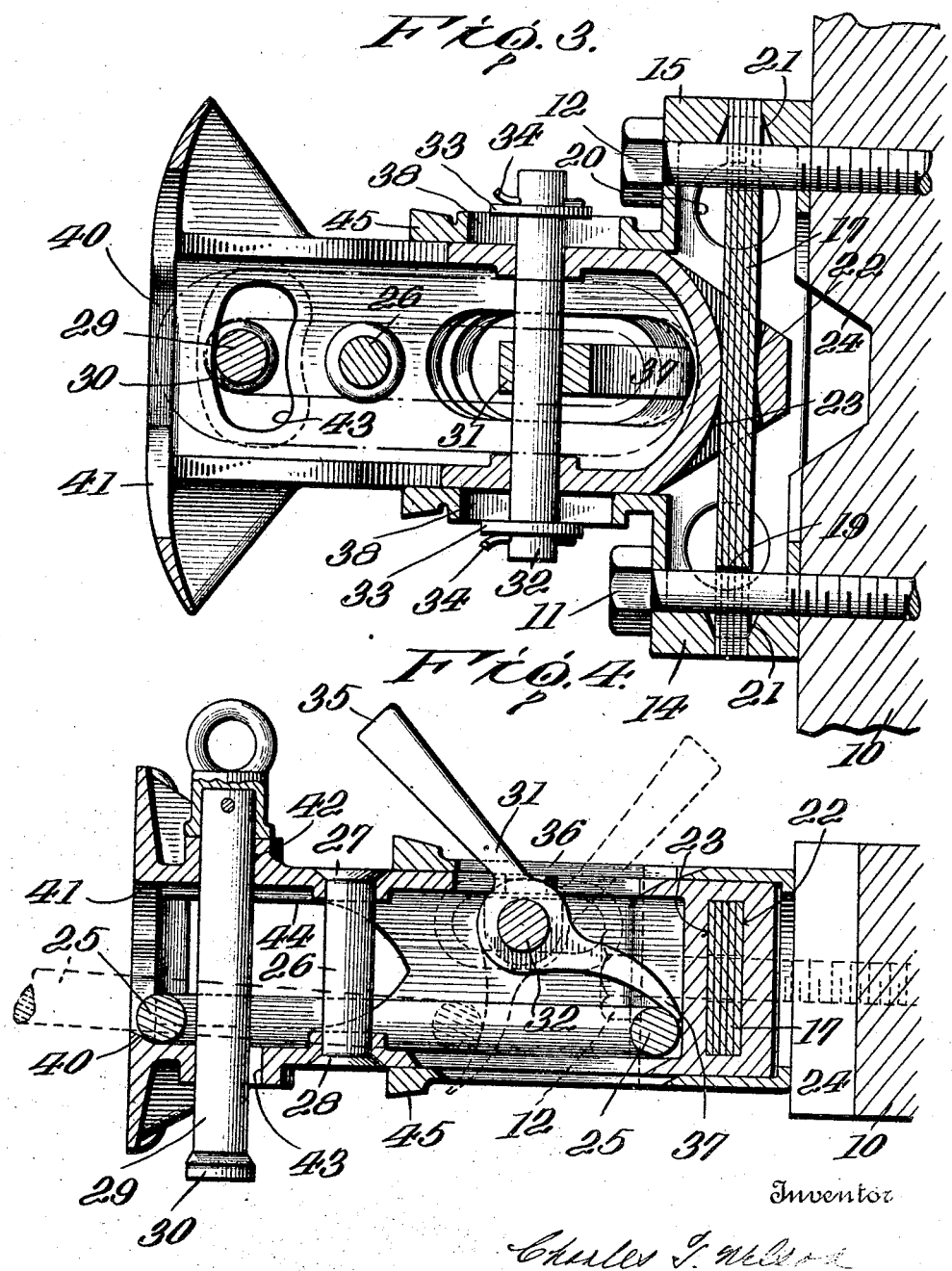

Jan. 22, 1924.

C. T. NELSON 1,481,620

DRAFT GEAR

Filed July 21, 1922   3 Sheets-Sheet 3

Inventor
Charles T. Nelson
By Britton & Gray
Attorneys.

Patented Jan. 22, 1924.

UNITED STATES PATENT OFFICE.

1,481,620

CHARLES T. NELSON, OF MANILA, PHILIPPINE ISLANDS, ASSIGNOR TO ATLANTIC GULF & PACIFIC COMPANY OF MANILA, OF MANILA, PHILIPPINE ISLANDS, A CORPORATION OF WEST VIRGINIA.

DRAFT GEAR.

Application filed July 21, 1922. Serial No. 576,588.

*To all whom it may concern:*

Be it known, that CHARLES THEODORE NELSON, a citizen of the United States, residing at the city of Manila, in the Philippine Islands, has invented certain new and useful Improvements in Draft Gears, of which the following is a specification.

The invention relates to draft gear, car couplers and has for an object the provision of a draw bar and coupler which is especially adapted to light service such as the coupling of cars for hauling sugar cane.

An illustrated embodiment of the invention is shown in the accompanying drawings, in which—

Figure 5:
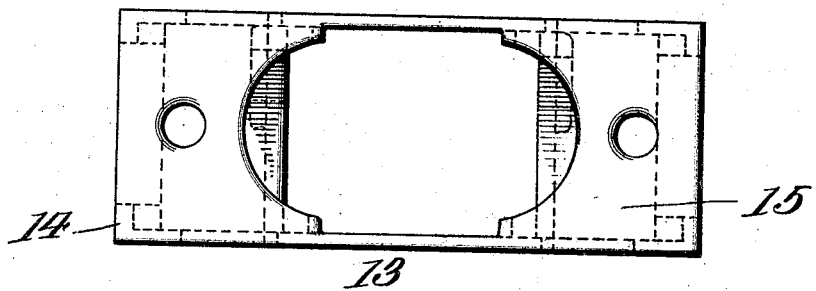
Figure 6:
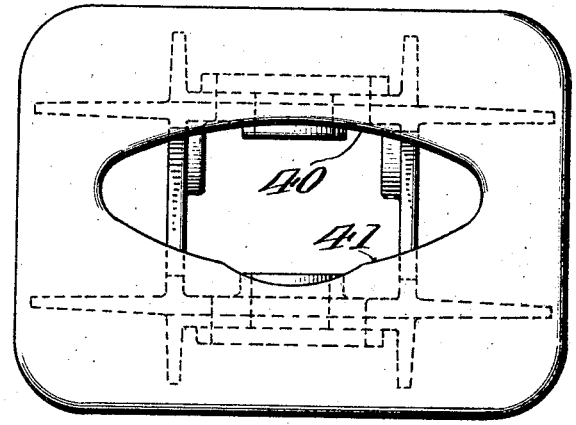

Figure 1 is a plan view,
Fig. 2 is a side elevation,
Fig. 3, is a horizontal section on line 3—3 of Figure 2,
Fig. 4, is a vertical section on line 4—4 of Figure 1,
Fig. 5, is a detail rear elevation, and
Fig. 6, is a detail front elevation.

The draft gear provided by present invention, is adapted to be secured to the face of the end sill 10, a fragment of which is shown in the drawings, by means of bolts 11, 12 and is shown as comprising an outer portion 13 having projecting portions 14, 15 through which the bolts pass, and an inner portion 16, telescoping within the outer portion 13. The inner portion 16, provides the draw bar and the coupler head.

To provide a cushion for both buff and draft, a spring 17, made up of a plurality of leaves, is provided, the spring adapted to be asembled with the portion 13 of the gear by insertion through slots 18, one of which is shown in each side of the member 13.

To retain the leaves of the spring 17 in place, the bolts 11, 12 may be passed through the holes in the spring, but preferably a recess is provided in each end of each leaf terminating at 19, the recesses being sufficiently deep to permit deflection of the spring without binding upon the shanks of the bolts. For convenience in assembling the spring with the draft gear, openings 20 are provided in both upper and lower walls of the member 13. To permit deflection of the springs without undue binding in the slots 18, the slots are beveled internally as shown at 21.

To coact with the leaf spring 17, the draw-bar has a slot through the extremity thereof, the surfaces thereof opposite the spring being rounded as shown at 22, 23. Preferably a notch 24 is formed in the end sill to permit the sliding of the draw bar in buff with yielding of the spring 17.

It is designed that the draw-bar house a coupling link 25 which is permanently secured therein and which may be passed to a position entirely within the draw bar allowing the use of the other coupling link on the car which is coupled therewith. In other words either of the two coupling links carried by the two jointed draft gears may be utilized to couple any two cars together. As shown most clearly in Figures 3 and 4 the link when not in use lies within the hollow of the draw bar 16 and is permanently retained therein by means of a pin 26, which is upset at 27 and 28 so as to retain the same permanently in position. The coupling of the draw bar under consideration with the coacting link on another car is adapted to be made by means of a movable coupling pin 29. When using the link in which the coupling pin 29 is seated, the same need not be removed, it being only necessary to remove the pin from the coupler head of the car into which the link of the attached car is to be inserted. To avoid a tendency of the pin 29 which need not be removed, from being jarred out, a head 30 is provided on its lower end.

To project the link which is to be used to make a coupling, a lever 31 is shown as pivoted upon a pin 32 which passes through the coupling bar and is retained therein by means of washers 33 and cotter pins 34. The lever 31 is shown as having a handle portion 35 projecting through a slot 36 in the upper portion of the member 13 which slot is elongated to allow of the telescopic movements of the draw bar during draft or buff. The lower end 37 of the lever is shown as contacting with the end of the link 25 and as being movable to the dotted line position Figure 4, when the link is projected.

To allow the movement in draft and buff of the draw-bar 16, the slots 38 in the member 13 through which the pin 32 projects are elongated and are preferably provided with bosses 39 on their outer faces for coaction with the washers 33.

To automatically lift the link 25, when it is projected by the lever 31 so as to pass over the unused link in the opposing coupler, an upwardly inclined lip 40 is preferably formed on the lower edge of the opening 41 through which the link projects. To allow of the swinging action of the coupler link when cars equipped with the draft gear round curves in the track, the opening 41 is laterally elongated as shown most clearly in Figure 6.

When the link in the draft gear under consideration is used to make the coupling the pull of the draft is taken by the pin 26. To permit the link 25 to swing about the pin 26 as a center when the cars round curves, the openings through which the pin 29 pass at the top and bottom of the coupler head are made in the form of elongated slots, as shown at 42, 43 (see Figures 1 and 3).

To provide access to the link 25 on the side in case it is necessary to insert a tool to lift the same, the side of the draw bar is provided with openings as shown at 44. To strengthen the edge of the member 13 to resist impact of the coupler head thereagainst during excessive movement in buff, the edge is preferably thickened as shown at 45.

Minor changes may be made in the physical embodiment of the invention without departing from the spirit thereof.

I claim:—

1. A draft gear comprising in combination, a casing adapted to be bolted to the face of the end sill of the car by means of horizontal bolts, a leaf spring mounted in said casing and retained therein by means of said bolts, a draw bar through which said leaf spring passes and slidably mounted in said casing, means for attaching said draw bar to a coacting draft gear.

2. A draft gear comprising in combination, a casing adapted to be secured to the face of the end sill of a car by means of horizontal bolts, a leaf spring retained in said casing by means of said bolts, said casing having slots against the faces of which said leaf spring impinges, a draw bar slidably mounted in said casing for movement in draft and buff and through which said leaf spring passes, a coupling link permanently housed in said draw-bar, a lever pivoted in said draw bar and having a projecting handle and a tip for projection of said link, said casing having a slot through which the handle projects for movement of said draw bar during draft and buff.

3. A draft gear comprising in combination, a casing adapted to be secured to the end sill of a car, a draw-bar slidably mounted in said casing, means in said casing to cushion the draft and buffing shocks of said draw bar, a coupling link permanently mounted in said draw-bar adapted to be completely housed therein, a hand lever for projection of said link for use, a pin upon which said hand lever is mounted passing through openings in said draw bar, and through slots in said casing, said slots being elongated to allow movement of said pin during sliding movement of the draw bar caused by draft or buff stresses.

4. A draft gear comprising in combination, a casing adapted to be attached to the face of the end sill of a car by means of bolts, a leaf spring retained in said casing by said bolts, a draw bar slidably mounted in said casing for movement in draft and buff, said spring passing through said bar, a coupling link permanently housed in said bar, a lever for projection of said link pivoted in said bar and having a handle projecting through an elongated slot in said casing, and an upwardly and outwardly inclined lip on said bar to raise said link as it is projected by said lever.

CHARLES T. NELSON.